Nov. 22, 1966 H. A. BENNETT ETAL 3,287,609

CONTACT ASSEMBLY

Filed July 14, 1964

PRIOR ART

THE INVENTION

INVENTORS
HAROLD A. BENNETT
ROBERT W. MARTIN
BY
S. C. Yeaton
ATTORNEY

United States Patent Office 3,287,609

Patented Nov. 22, 1966

3,287,609
CONTACT ASSEMBLY

Harold A. Bennett and Robert W. Martin, both of Ridgefield, Conn., assignors to Sperry Rand Corporation, Great Neck, N.Y., a corporation of Delaware Filed July 14, 1964, Ser. No. 382,448
3 Claims. (Cl. 317—234)

This invention relates in general to semiconductor devices, and in particular the invention relates to an improved form of apparatus for making contacts with semiconductor elements.

The prior art is replete with contact producing techniques (U.S. Patents 2,694,168, 2,896,134, 3,027,502, 3,036,251, etc.) over which the invention is an improvement, the invention allowing not only for improved and better quality controlled manufacturing methods, but also for more reliable units (less subject to failure due to temperature variations and mechanical shock).

Figure 1:
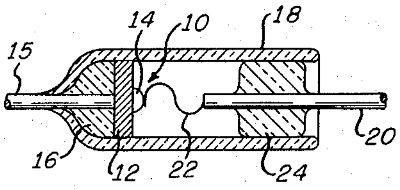
Figure 2:
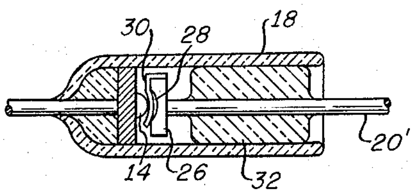
Figure 3A:
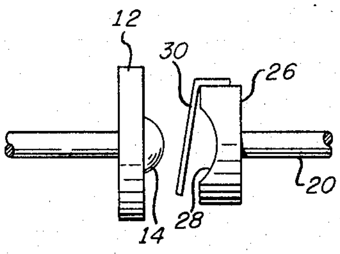
Figure 3B:
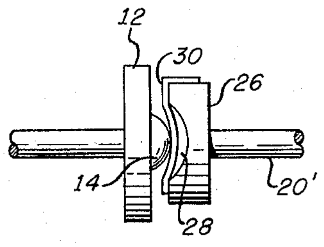
Figure 4A:
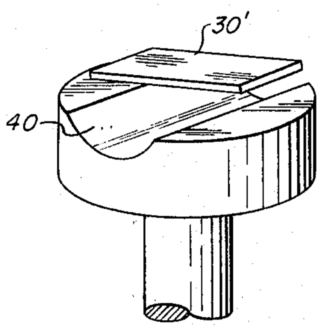
Figure 4B:
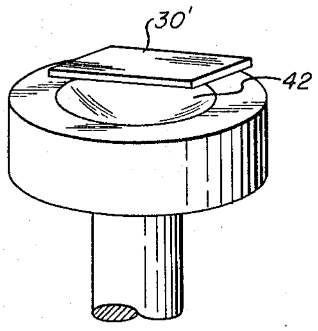

How the invention improves on the prior art is best shown with reference to the figures wherein:

FIG. 1 is a view showing the general makeup of prior art semiconductor diodes over which the invention is an improvement, FIG. 2 is a view showing a semiconductor diode employing the invention, FIGS. 3*a* and 3*b* are diagrams showing how the invention provides an electrical contact to a semiconductor device, and FIGS. 4*a* and 4*b* show respectively a presently preferred and an alternate form of nailhead member useful with the invention.

A principal object of the invention is to provide an improved form of electrical contact.

Another object of the invention is to provide an easily manufactured semiconductor device.

Another object of the invention is to provide semiconductor device contacts which are resistive to open (electrically) in response to temperature variations and mechanical shock in the region of said contacts.

Another object of the invention is to provide a spring loaded contact for use with a semiconductor device, which contact comprises parts that cooperate to resist relative sideways motion between said device and said contact.

Referring to FIG. 1, a prior art diode over which the invention improves has a semiconductor element 10 with a wafer part 12 and a raised boss-shape part 14, the semiconductor wafer part 12 having a lead 15 soldered to it to provide a first electrode element. A glass bead 16, slid onto the lead 15 and fused thereto, serves as a base for the semiconductor element 10. A tubular glass sleeve 18 is slid over the bead 16-element 10 assembly and fused to the bead 16, for example by application of a suitable amount of heat, to form an integral first section of the diode.

To provide the second electrode element, a lead 20 has, for example, an S-bend wire 22 attached to it, which wire 12 is brought to and held under proper tension against the boss-like semiconductor part 14. For alignment purposes, and to maintain the aforementioned tension, a glass bead 24 (slid onto the lead 20 and fused thereto to form a second integral section) is fused to the tubular glass sleeve 18, whereby the S-bend wire is substantially prevented from axially moving relative to the semiconductor part 14.

How the invention improves on the apparatus of the prior art is as follows: The S-bend wire is removed and replaced with a shorter contact assembly, thereby at the outset allowing for either a shorter end product, or one of equivalent size but having better manufacturing and quality advantages.

Referring now to FIGS. 2 and 3*a*, 3*b*, the equivalent-sized device of the present invention has a first integral section identical with that of the above-referred to prior art first integral section. The second integral section is however different. A lead 20', for providing the second electrode element, has a nailhead 26 secured thereto. The nailhead 26 is provided with a recess 28, and a leaf spring 30 extends across the recess. The leaf spring 30 is electrically and thermally conductive, and is preferably bent slightly away from the face of the nailhead 26, as shown. An elongated glass bead 32, slid onto the lead 20' and fused thereto, is fused to the inner wall of the glass tube 18 with the leaf spring 30 under tension and bearing against the boss-like member 14.

When the first and second integral sections are assembled together as noted immediately above, the boss-like semiconductor part 14, as shown by FIG. 3*b*, bears against the leaf spring 30, bending it concavely into the nailhead recess 28. This is made possible by suitably arranging the relative dimensions of the leaf spring 30, the boss-like part 14 and the recess 28. That is, by making the leaf spring 38 long enough to bridge the recess (when the whole unit is assembled) and by making the recess 28 large enough to accommodate at least part of the boss-like member 14, a concave form can be accorded the spring 30 when under tension.

With the prior art apparatus of FIG. 1, trouble has been experienced during mass production manufacture in the alignment of the S-bend wire 22 with the boss-like part 14, this being caused by required use of a shortened bead 24 which allows for substantial wobbling of the second integral section within the sleeve 18 part of the first integral section. With the elongated bead 32, which the shortened contact assembly of the present invention permits, wobbling of the second integral section within the first is kept to a minimum, thereby allowing for improved manufacturing techniques.

Since the contact between the convexly shaped boss-like member 14 and the S-bend wire of the prior art is essentially a point contact, the S-bend wire, as caused by shock, vibration, etc. is quite free to move sideways relative to the axis of the unit, and thereby electrically open the contact. In contrast to this, the present invention provides a cup-like seat into which the boss-like part 14 sits, and in which it is essentially restrained. Hence, with the contact of the invention, diode electrical open circuits as caused by mechanical shock etc. are virtually impossible.

As to the question of heat sensitivity, the S-bend wire of the prior art is free to expand and contract, and thereby provide at times intermittently good and bad performance. In contrast to this, the cooperating nailhead recess 28 and leaf spring configuration of the invention requires, for the contact to open, that the spring 30 be placed under greater tension and be bent farther into the recess, which fact by way of corollary means the contact in essence cannot open electrically. Were tension to the spring to release, the preformed bend in the spring 30 will maintain the contact electrically closed.

FIG. 4*a* shows the presently preferred form of nailhead 26 having its recess in the nature of a groove running across the nailhead face, a flat spring 30' being preferred here also. It is to be understood however that this form of nailhead, while presently preferred because of the manufacturing ease with which it may be provided, is by no means the only embodiment of the invention, FIG. 4*b* for example showing that the invention may also be employed with nailheads having round recesses 42.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A semiconductor device comprising a diode element with one of its electrodes formed with a boss, a contact member with a recess large enough to permit at least part of said boss to be inserted there into, an unapertured flexible electrically conductive blade secured to said contact member at one side of said recess and bridging said recess, means so supporting rigidly said diode element and said contact member that said boss bears against said blade and bends it into said recess, and means bringing electrical leads respectively to the other of said diode element electrodes and to said contact member.

2. A semiconductor device comprising a diode element with one of its electrodes formed with a boss, a contact member with a recess large enough to permit at least part of said boss to be inserted there into, an unapertured flexible electrically conductive blade secured to said contact member on one side of said recess and bridging said recess, means so supporting rigidly said diode element and said contact member that said boss bears against said blade and bends it into said recess, said blade when not under tension being bent away from said recess, and means bringing electrical leads respectively to the other of said diode element electrodes and to said contact member.

3. A diode comprising semiconductor material doped to form N and P type sections, a first lead connected to one of said sections, the other of said sections being formed with a boss, a sleeve of electrically non-conductive material holding said lead and semiconductor material in place within it, a second lead, an electrically conductive nailhead having a recess within its face, said nailhead being secured to said second lead, an unapertured leaf spring secured to said nailhead on one side of said recess and bridging said recess, and an electrically non-conductive bead secured to said second lead and to said sleeve and holding said nailhead axially in place within said sleeve and causing said boss to bear against said leaf spring whereby said leaf spring is depressed partially into said recess.

References Cited by the Examiner

UNITED STATES PATENTS

| | | | |
|---|---|---|---|
| 2,728,881 | 12/1955 | Jacobi | 317—236 X |
| 2,781,480 | 2/1957 | Mueller | 317—234 |
| 3,059,157 | 10/1962 | English et al. | 317—234 |
| 3,077,629 | 2/1963 | Siner et al. | 317—236 X |

JOHN W. HUCKERT, *Primary Examiner.*

A. M. LESNIAK, *Assistant Examiner.*